US012721303B2

(12) United States Patent
Crafts

(10) Patent No.: US 12,721,303 B2
(45) Date of Patent: Sep. 1, 2026

(54) PEE SPOT COVER FOR ANIMAL PEE PADS

(71) Applicant: Cynthia Susan Crafts, Swansea, MA (US)

(72) Inventor: Cynthia Susan Crafts, Swansea, MA (US)

( * ) Notice: Subject to any disclaimer, the term of this patent is extended or adjusted under 35 U.S.C. 154(b) by 0 days.

(21) Appl. No.: 19/291,880

(22) Filed: Aug. 6, 2025

(65) Prior Publication Data

US 2026/0041057 A1 Feb. 12, 2026

Related U.S. Application Data

(60) Provisional application No. 63/680,150, filed on Aug. 7, 2024.

(51) Int. Cl.

*A01K 1/015* (2006.01)
*A01K 1/01* (2006.01)
*G09F 23/00* (2006.01)

(52) U.S. Cl.

CPC ........ *A01K 1/01577* (2025.08); *A01K 1/0107* (2013.01); *G09F 23/00* (2013.01)

(58) Field of Classification Search

CPC .... A01K 1/01577; A01K 1/0107; A01K 1/01; A01K 1/0157; A01K 1/015

See application file for complete search history.

(56) References Cited

U.S. PATENT DOCUMENTS

| | | | | |
|---|---|---|---|---|
| 8,033,249 B1 * | 10/2011 | Cook | A01K 1/0107 119/165 |
| 8,220,622 B1 * | 7/2012 | Lewis | A01K 1/0107 119/168 |
| 10,219,487 B2 * | 3/2019 | Hasegawa | A01K 1/0157 |
| 11,570,964 B2 * | 2/2023 | Miwa | A01K 1/0157 |
| 12,310,327 B2 * | 5/2025 | Woo | A01K 1/0125 |
| 2001/0025910 A1 * | 10/2001 | Olivadoti | A01K 1/0107 248/346.01 |
| 2008/0105208 A1 * | 5/2008 | Hamrick | A01K 1/0107 119/165 |
| 2010/0275853 A1 * | 11/2010 | Petersen | A01K 1/0107 119/165 |
| 2011/0192419 A1 * | 8/2011 | Davis | B08B 17/00 428/116 |
| 2012/0118241 A1 * | 5/2012 | Smith, II | A01K 1/0107 119/167 |
| 2012/0234253 A1 * | 9/2012 | Malm | A01K 1/0107 119/169 |

* cited by examiner

*Primary Examiner* — Trinh T Nguyen
(74) *Attorney, Agent, or Firm* — Dunlap Bennett & Ludwig PLLC; Anna L. Kinney

(57) ABSTRACT

A reusable pee spot cover for animal pee pads includes a tray featuring upper and lower surfaces, a peripheral lip protruding perpendicularly along the tray perimeter and at least one lifting handle for repositioning. The tray may include a visual indicator on its lower surface and can be fabricated from materials such as plastic, cloth, cardboard, or wood. The cover addresses the technical problem of rapid saturation and contamination of pee pads by concealing soiled areas, guiding pets to cleaner sections, and reducing waste tracking. Principal uses include extending pad lifespan and creating enrichment activities for pets. A method involves detecting soiled portions and positioning the cover to conceal contamination.

3 Claims, 3 Drawing Sheets

PEE SPOT COVER FOR ANIMAL PEE PADS

CROSS-REFERENCE TO RELATED APPLICATION

This application claims the benefit of priority of U.S. provisional application No. 63/680,150, filed Aug. 7, 2024, the contents of which are herein incorporated by reference.

BACKGROUND OF THE INVENTION

The present invention relates to pet care products and, more particularly, to devices designed to increase the usability and improve the cleanliness of animal pee pads.

Disposable absorbent pads (i.e., "pee pads") designed to facilitate housebreaking and containment of animal waste have been widely adopted for indoor pet training and hygiene management. Such products are commonly employed to provide a sanitary surface for dogs, cats, and other small animals. Despite their utility, these pads are designed for single use in relation to localized soiling events, which limits their operational lifespan and increases environmental burden. These pads have been associated with growing concerns related to consumer costs, sustainability, and indoor hygiene maintenance.

Routine use of disposable absorbent pads often results in rapid saturation and visible discoloration once a localized region becomes soiled. In many cases, the confined nature of the pad's surface offers limited opportunity for animal repositioning, prompting pets to step directly into damp or contaminated zones. This interaction not only compromises the immediate cleanliness of the surrounding area but also necessitates prompt pad replacement to avoid malodor and unsanitary conditions. Additionally, repeated contact with wet zones can lead to tracking of moisture and waste particles beyond the intended containment area, further undermining the pad's purpose. Conventional strategies, such as folding unused sections or manually marking clean portions, lack consistency and may disrupt the animal's natural deposit patterns, thereby reducing overall pad efficacy and lifespan.

As can be seen, there is a need for a simple solution that covers soiled areas, directs animals to clean sections of the pad, and maintains indoor hygiene without requiring early disposal of the entire absorbent pad.

SUMMARY OF THE INVENTION

In one aspect of the present invention, the disclosure includes a spot cover comprising a tray configured to overlie at least one soiled portion of a disposable absorbent pad, the tray defining upper and lower surfaces; a peripheral lip protruding perpendicularly to the lower surface along the tray perimeter; and at least one lifting handle projecting from the upper surface at a tray corner. In some embodiments, a visual indicator is disposed on the lower surface. In some embodiments, the tray, lip, and handle are monolithically formed from a plastic material. In some embodiments, the peripheral lip engages and retains the tray on the pad to prevent lateral movement during use. In some embodiments, the tray is weighted to function as a paperweight to maintain pad position on an underlying surface. In some embodiments, the tray is formed of a cardboard material.

In another aspect of the present invention, the disclosure includes a method for extending the usable surface area of a disposable absorbent pad, the method comprising providing the spot cover; placing the pad on an underlying support surface; detecting a soiled portion on the pad; and positioning the spot cover over the soiled portion such that the peripheral lip engages the pad to inhibit relative lateral movement and conceal the soiled portion. In some embodiments, the detecting and positioning steps are repeated to successively cover each newly soiled portion until all usable surface area is covered. In some embodiments, detecting the soiled portion comprises visually identifying a discoloration on the pad.

These and other features, aspects and advantages of the present invention will become better understood with reference to the following drawings, description, and claims.

DETAILED DESCRIPTION OF THE INVENTION

Figure 1:
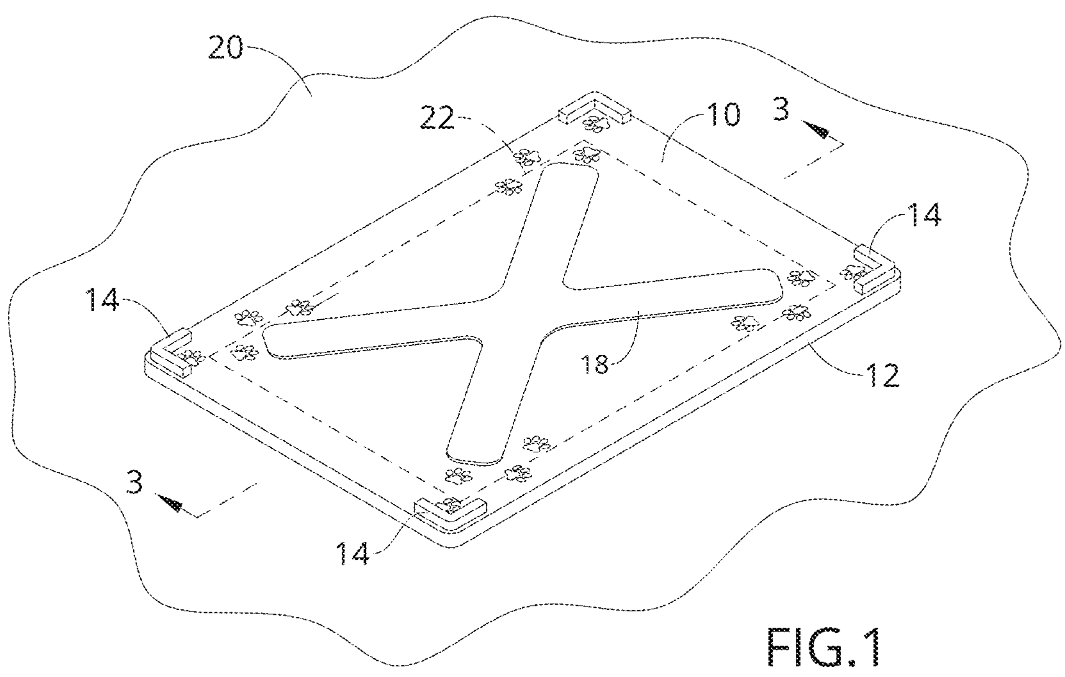
FIG. 1 is a top perspective view of a pee pad cover according to an embodiment of the present invention, shown in use.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a reusable pee spot cover intended to conceal soiled areas on a pee pad. This cover serves to obscure visible waste marks while guiding the pet's behavior toward unsoiled portions of the pad, thereby improving the pad's functional surface area. By methodically covering soiled regions, the described approach allows pet owners to extend the usage duration of each pad, decreasing the need for replacements and reducing the environmental impact linked to disposable pee pads. Additionally, the cover helps prevent pets from stepping into contaminated areas, reducing the likelihood of waste tracking and supporting a cleaner indoor environment.

The pee spot cover can be fabricated from various materials, such as plastic, cloth, cardboard, or wood. The cover is designed to be lightweight, durable, and easy to reposition, allowing users to adapt the placement as needed. When a pet soils a specific area of the pad, the cover is placed over the spot, creating a visual and physical barrier that encourages the pet to use an unsoiled section. This process can be repeated until the entire pad is utilized, at which point the pad can be replaced. The simplicity and adaptability of the described approach make it an effective tool for improving the usability, hygiene, and sustainability of animal pee pads.

The cover can be produced using injection molding techniques for plastic embodiments, ensuring precision and consistency in the design. For cloth-based covers, industrial sewing machines can be employed to create reinforced seams and edges, enhancing durability during repeated use. Cardboard embodiments can be die-cut and laminated to provide structural integrity while remaining biodegradable.

Wood-based covers may be crafted using CNC machining or traditional woodworking methods, allowing for smooth finishes and customizable designs.

In embodiments, the pee spot cover can be used as a paperweight to keep the pee pad in place. If a dog defecates on the pad and the waste is not messy, the user can first remove and dispose of the waste, cover the spot with toilet paper, and then place the pee spot cover over it to prevent the dog from stepping in it. The covers can be used in a tic-tac-toe pattern, making the process more engaging or playful. The cover can be used to help collect a urine sample for veterinary purposes. Two covers can be stood up and leaned together to serve as a warning not to step in a particular area, for use both indoors and outdoors. The cover teaches the dog to walk around soiled spots and to urinate in a new, clean area, reinforcing better pad usage habits. The covers can create a fun obstacle course for the dog, adding an element of enrichment. The covers can be arranged on both sides of a path to guide the dog to walk in the middle.

Referring to FIGS. 1-6, FIGS. 1-5 illustrates a pee pad cover designed to obscure soiled areas on a pee pad and direct animal behavior toward cleaner sections. The central structural element of the pee pad cover is a tray 10, which serves as a stable and durable base for the device. The tray 10 is configured to cover a used pee pad section 22. Lifting handles 14 are integrated into the corner portions of the tray 10. These handles 14 are ergonomically designed to facilitate easy repositioning of the cover. The placement of the lifting handles 14 at the corners ensures that the user can lift and move the cover without disturbing the underlying pee pad 20. This feature is particularly useful for adjusting the cover as new areas of the pee pad 20 become soiled. The lifting handles 14 also serve to elevate the cover from an underlying surface when the cover is inverted. A top surface of the tray 10 includes a decorative element, referred to as surface decoration 18. This decoration 18 may serve both functional and aesthetic purposes. Functionally, the surface decoration 18 can provide a visual cue, signaling that the covered area is soiled. Aesthetically, the decorative element 18 enhances the overall appearance of the device, making the device more appealing for use in indoor environments.

Figures 3, 4, 5:
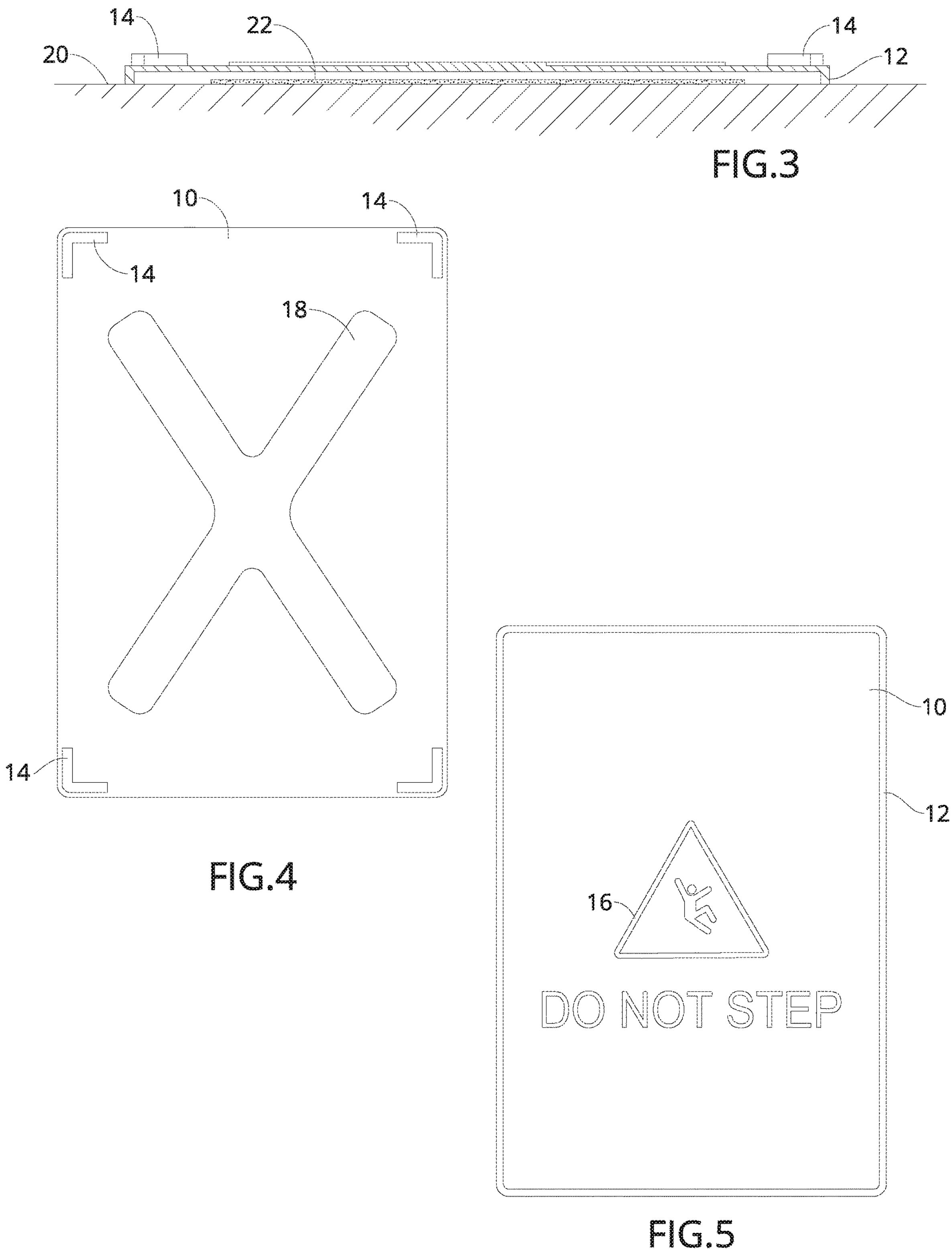
FIG. 3 is a sectional view thereof, taken along line 3-3 of FIG. 1.
FIG. 4 is a top plan view thereof.
FIG. 5 is a bottom plan view thereof.

The pee pad cover is shown in use with a pee pad 20 in FIGS. 1 and 3, where the cover conceals a used pee pad section 22. By covering the soiled area, the device prevents the pet from stepping into the contaminated zone, thereby reducing the risk of waste tracking and promoting a cleaner environment. The design of the cover allows for easy repositioning as needed, enabling the user to make efficient use of the functional surface area of the pee pad 20.

Figure 2:
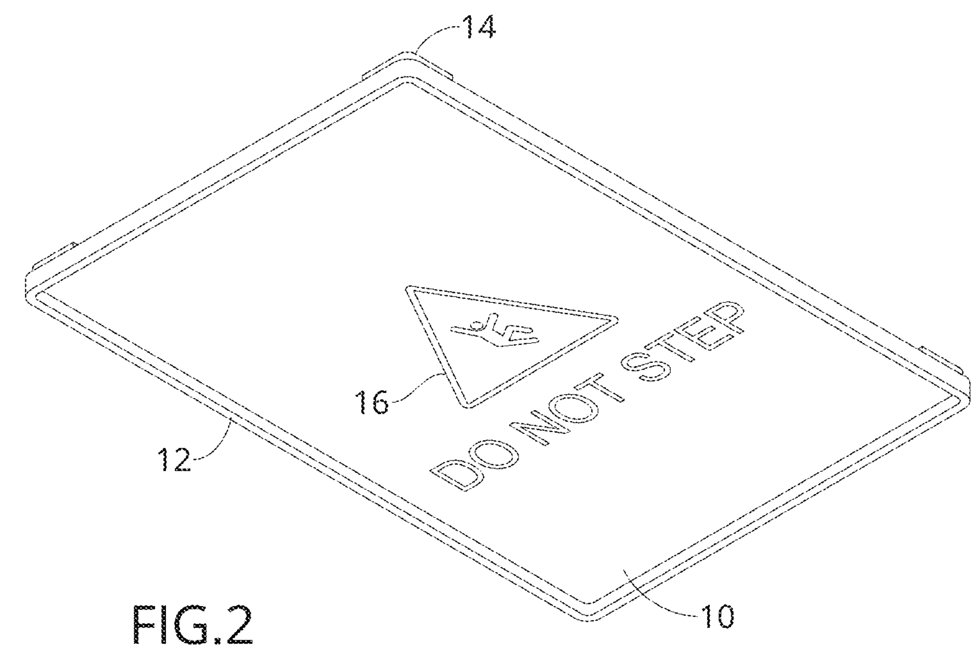
FIG. 2 is a bottom perspective view thereof.

As shown in FIG. 2, a lower surface of the tray 10 is bordered by a lower side wall, or lower raised lip 12, which protrudes perpendicular to the lower surface along the perimeter of the tray. This lower raised lip 12 serves to prevent the cover from sliding off the pee pad during use, ensuring that the cover remains in place even if the pet interacts with the tray. The raised lip 12 also provides a slight elevation, creating a physical barrier between the lower surface of the tray 10 and the soiled portion of the pee pad 20. A warning visual indicator 16 is located on the lower surface of the tray 10, with text such as "DO NOT STEP" and an accompanying symbol. The lip 12 may have a thickness about equal to the thickness of the tray 10. The height of the lip 12 may be about equal to the thickness of the tray 10 or larger.

FIG. 3 shows a sectional view of the pee pad cover in use, providing a detailed illustration of the interaction between the core tray 10, the lower sidewall 12, the lifting handles 14, the pee pad 20, and the used pee pad section 22. The core tray 10 is positioned directly over the used pee pad section 22, effectively concealing the soiled area while preserving the usability of the remaining clean portions. The lifting handles 14 are integrally formed at the corners of the upper surface of the core tray 10. As shown, each lifting handle 14 may have a 90° angle formed therein. The lifting handles 14 may have any suitable size, provided that they have a length less than half of the length or width of the tray 10. The height of each lifting handle 14 is generally about the same as the thickness of the tray 10, although the lifting handles 14 may in some instances have a height several times the thickness of the tray 10.

Figure 6:
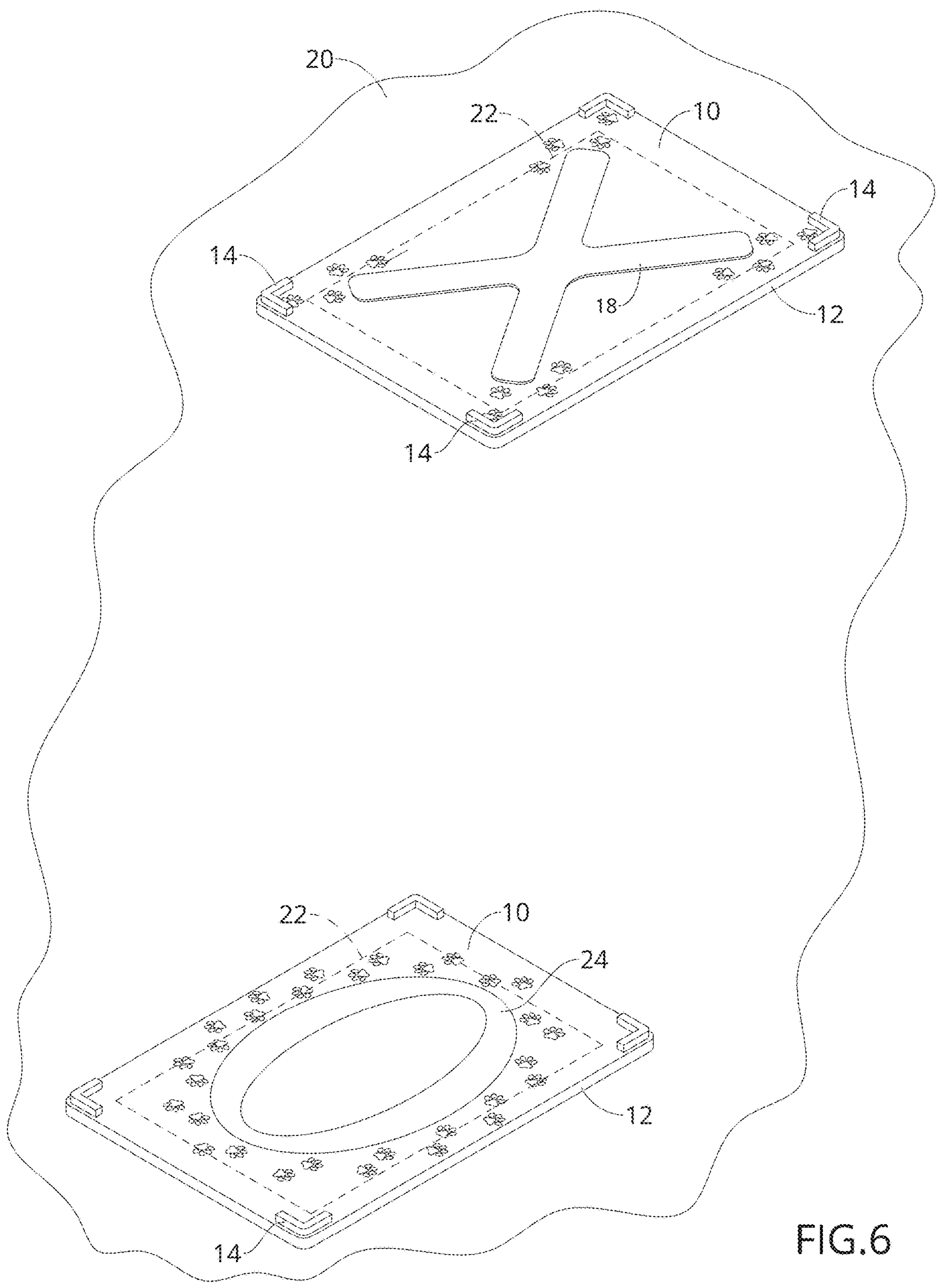
FIG. 6 is a perspective view of pee pad covers according to another embodiment of the present invention, shown in use.

FIG. 6 shows pee spot covers according to an alternate embodiment of the present invention, illustrating variations in the design and functionality of the core tray 10. In this embodiment, the core tray 10 features distinct surface decorations 18 and 24. The surface decoration 18 is configured in a cross-shaped pattern and the surface decoration 24 is configured in an oval-shaped pattern, enabling the user to utilize the pee spot covers in a tic-tac-toe pattern.

It should be understood, of course, that the foregoing relates to exemplary embodiments of the invention and that modifications may be made without departing from the spirit and scope of the invention as set forth in the following claims.

What is claimed is:

1. A method for extending the usable surface area of a disposable absorbent pad, the method comprising:

providing a spot cover comprising: a tray configured to overlie at least one soiled portion of a disposable absorbent pad, the tray having an upper surface and a lower surface; a peripheral lip protruding normal to the lower surface along a perimeter of the tray; and at least one lifting handle projecting from the upper surface at a corner of the tray;

placing the disposable absorbent pad on an underlying support surface;

detecting the at least one soiled portion on the disposable absorbent pad; and positioning the spot cover over the at least one soiled portion such that the peripheral lip engages a region of the disposable absorbent pad to inhibit relative lateral movement of the spot cover, thereby concealing the at least one soiled portion.

2. The method of claim 1, further comprising repeating the detecting and positioning steps to successively cover each newly soiled portion of the disposable absorbent pad until all usable surface area is covered.

3. The method of claim 1, wherein detecting the at least one soiled portion comprises visually identifying a discoloration on the disposable absorbent pad.

* * * * *